No. 826,714. PATENTED JULY 24, 1906.
W. F. ELLIOTT.
FLY SHIELD.
APPLICATION FILED SEPT. 15, 1905.
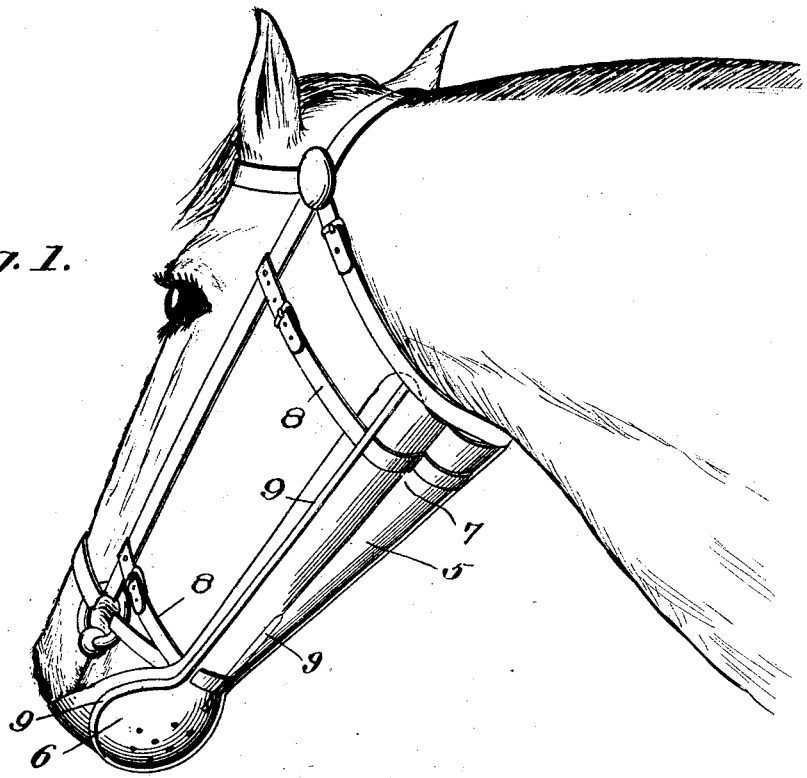
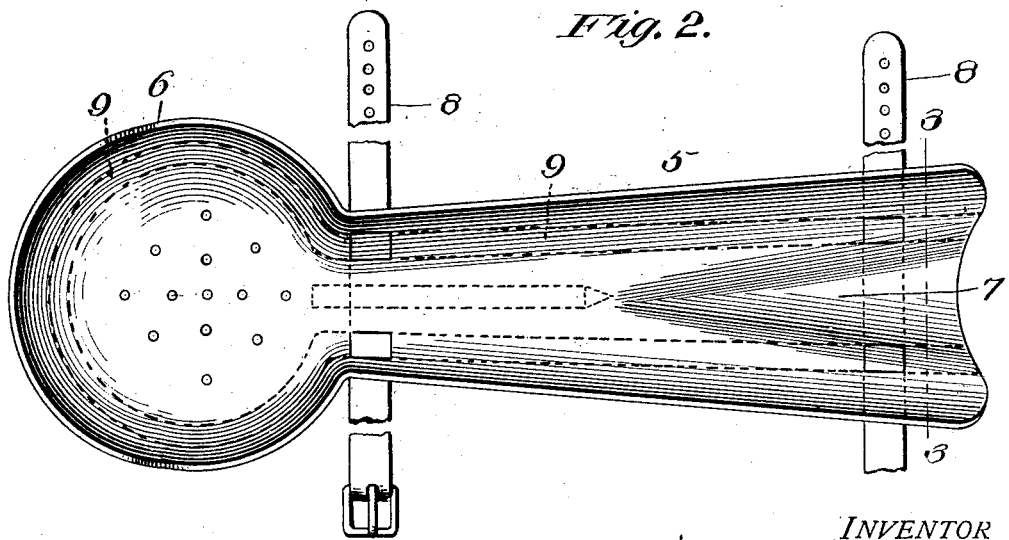
WITNESSES:
INVENTOR
William F. Elliott
By Milo B. Stevens & Co
Attorneys

UNITED STATES PATENT OFFICE.

WILLIAM F. ELLIOTT, OF DE KALB, ILLINOIS.

FLY-SHIELD.

No. 826,714.         Specification of Letters Patent.         Patented July 24, 1906.

Application filed September 15, 1905. Serial No. 278,675.

*To all whom it may concern:*

Be it known that I, WILLIAM F. ELLIOTT, a citizen of the United States, residing at De Kalb, in the county of Dekalb and State of Illinois, have invented new and useful Improvements in Fly-Shields, of which the following is a specification.

My invention is a fly-shield, and more particularly a device for protecting the throat and lips of horses or other animals from botflies or other insects; and it consists in certain novel features of construction hereinafter described and claimed.

In the accompanying drawings, Figure 1 is a perspective view of the invention, showing the application thereof. Fig. 2 is a plan view of the shield removed. Fig. 3 is a section on the line 3 3 of Fig. 2.

Referring specifically to the drawings, the shield is indicated at 5 and is shaped to fit snugly under the lower jaw of the animal. The lower end of the shield is made cup-shaped, as at 6, and fits over both lips of the animal. The upper end of the shield is formed with a ridge or raised portion 7, which extends between the jaw-bones to assist in keeping the shield in place and to fit the throat closely. The shield is provided at each end with attaching-straps 8, whereby it is secured to the animal, said straps being fastened to the bridle.

The shield will be made of rubber, so that if accidentally disarranged it will spring back in its place. It is also reinforced by ribs 9 to give it the necessary stiffness.

The shield is designed to protect animals from the attacks of insects, and especially bot-flies, which approach from below and deposit their eggs on the lips and throat of the animal. These parts are effectively protected by a shield constructed and arranged as herein described.

Having thus described my invention, what is claimed as new, and desired to be secured by Letters Patent, is—

1. An insect-shield comprising a body portion shaped to fit under the jaw of the animal and having a cup-shaped lower end fitting over the lips of the animal.

2. An insect-shield comprising a body portion shaped to fit under the jaw of the animal, and having at one end a ridge extending between the jaw-bones, and cup-shaped at the opposite end to fit over the lips of the animal.

In testimony whereof I have signed my name to this specification in the presence of two subscribing witnesses.

WILLIAM F. ELLIOTT.

Witnesses:
    W. L. ELLWOOD,
    A. W. FISK.